UNITED STATES PATENT OFFICE.

CHARLES S. VADNER, OF BUTTE, MONTANA.

RECOVERY OF METALS FROM ORES AND THE LIKE.

1,245,137.      Specification of Letters Patent.      Patented Oct. 30, 1917.

No Drawing.      Application filed December 16, 1916. Serial No. 137,461.

*To all whom it may concern:*

Be it known that I, CHARLES S. VADNER, a citizen of the United States, and a resident of Butte city, Silver Bow county, Montana, have discovered a new and useful Process for the Recovery of Metals from Ores and the like, of which the following is a specification.

It is well known that in various smelting operations, in roasting ores and in various other operations that produce sulfurous gases that a large amount of obnoxious fumes are emitted into the air and that these fumes and gases are a source of annoyance and injury to animal and vegetable life. While the mechanical impurities contained in these fumes can be fairly well arrested by the baghouse system and by the use of long flues and baffles, the sulfurous fumes and gases are but partially arrested or rendered inocuous by them.

One of the objects of my invention then is to utilize these sulfurous fumes and the contained heat and to render them harmless to all forms of life.

Another object of my invention is to provide an effective and inexpensive method of recovering metals from mineral matter and the like.

To accomplish these objects I make use of the heat and sulfurous gases contained in fumes, subjecting oxids, carbonates and sufficiently roasted sulfid ores containing copper, iron, zinc, lead, arsenic, antimony, cadmium lime, bismuth and manganese, in the presence of a sufficient quantity of water, to the action of these sulfurous gases. By this means these metals are extracted and recovered from the ores and the fumes arrested and rendered harmless.

It will be understood that if desirable in cases where smelter fumes are not available, sulfur can be burnt in order to provide the necessary sulfurous gases for the reduction of ore.

Oxid, carbonates or sufficiently roasted sulfid ores are ground to the proper size and showered or sprayed in water down through the first of a series of solution towers. These towers are of suitable size and height according to the quantity of ore to be treated and the length of time the ore requires to be exposed. The sulfurous fumes are led into these solution towers and mingled with the sprayed ore pulp. By means of this spraying, every particle of ore is subjected to the action of the sulfurous gases, which, in the presence of water, effects the solution of the copper and zinc, some of the iron and arsenic and other metals contained as aforesaid in the ore. This solution falls to the sump at the bottom of the tower while the unused gases pass on to the next tower. These towers are interposed between the points in the flues where the sulfurous gases are all united and the point from which they are finally voided. The sulfurous fumes are drawn either by natural or artificial draft from the main flue in the base of the first tower and by a suitable flue led down into the base of a second tower, thence up through the tower and down again to the base of the third tower and so on throughout the series of towers and finally out of the stack. In each tower the fumes come in contact with the sprayed ore pulp so that the sulfurous gases may have a chance to unite with the metals, and fall to the sump at the bottom. As many towers can be interposed in the path of the sulfurous fumes as may be found necessary in order to expose sufficient ore requisitely long to take from the fumes all the sulfurous gases and render them harmless enough to be voided into the air. Where the smelter stack is built on an elevation with the flues leading thereto and with towers interposed in succession in the path of the flues, the sprayed ore pulp can be fed again to the successive towers by gravity, otherwise it can be drawn up by pumps.

The solution towers are built over sumps into which the solution of ore and dissolved sulfurous vapors and undissolved ore falls. If the settled and undissolved portion of the ore is found to contain sufficient values it is removed from the sump and sent to the smelter, where on account of the lead, iron, gold and silver it is very desirable.

The residues can be also treated by a saturated solution of a soluble chlorid, preferably salt, the lead and silver will be extracted, and possibly some of the gold. The insoluble residue is eliminated and the pregnant solution is passed over metals such as zinc and iron, preferably iron, the metals, chiefly lead and silver, being recovered in metallic form. The undissolved portion of the above mineral matter should be washed free from the original solvent before treatment with the saline solution.

I would not desire to limit myself to merely the use of sodium chlorid, but would use one or more, either separately or in combination, of the common soluble chlorids, such as those of magnesium, calcium, manganese, iron and copper. The recovery of the lead from such a chlorid solution can be hastened by a current of electricity applied in the ordinary manner. In the recovery of lead from a saline solution by means of iron, the recovery of lead is greater by using electricity in connection with the displacement of the lead from the solution by means of iron, said iron being introduced into the solution in the dual capacity of a displacing agent and an electrode, connections being made as in any electrical installation wherein copper or other metals are being recovered, the voltage of the current being maintained at such a pressure that the current acts as an aid or hastener of the deposition, in conjunction with that of the iron that is already engaged in depositing lead, the current used being insufficient to produce any decomposition otherwise than that effected by the iron, namely that of depositing metallic lead, the insoluble salts of iron that are produced being recovered; likewise the soluble zinc salts in case the lead is recovered by the use of zinc.

The original pregnant solution in some cases will not be free from lead and other metals, but if the solution is freed from acidity and oxidized with a suitable oxidizing agent the lead can practically be all precipitated onto the insoluble residue and recovered as aforementioned. The reduction of acidity and oxidization may be effected by means of air, by passing the solution over mineral matter and the like and by manganese compounds that can produce such an effect, such as $MnO_2$ and others.

The above means can be used separately, in part, or in combination as may be for the purpose mentioned. The lead, iron and zinc can be recovered in the form of metal and insoluble salts respectively, as mentioned before. The original pregnant solution above mentioned after the elimination of the lead therefrom can be treated for the elimination and recovery of other metals.

The original pregnant solution while being freed of lead as above mentioned is also freed of iron, a procedure which is necessary in the subsequent recovery of the metals that may be found in the original pregnant solution from which the lead has been eliminated. In case the precipitation of the iron is not quite complete air and a metallic oxid or carbonate can be used to complete same.

The original $SO_2$ pregnant solution being free from lead, iron and possibly some other metals, is treated with a metal; its oxid, hydrate and the carbonate of a metal also can be used, which will precipitate the manganese in the form, depending principally on the precipitant used, as may be. In the presence of a halogen element, compound and the like, such as bromin, chlorin, sodium hypochlorite or a mixture of same, the manganese will be precipitated in the form of a hydrated oxid; with the addition of a sufficiency of the haloid element, the black peroxid is obtained, same is separated, dried and becomes a valuable product. In the precipitation of the peroxid the solution can be kept slightly acid when found to be necessary in order to prevent the precipitation of other metals. The amount of precipitant used will be in accordance with the desired ends of the application of the process.

The above will serve to separate and recover lead, iron, manganese and other metals.

The metal zinc and compounds thereof can be used, also the compounds of calcium, sodium, potassium and magnesium, as above described.

The recovery of zinc from mineral matter and the like becomes a matter of importance, however, as zinc ores are not found in nature entirely free from other metals, a separation becomes imperative for example with an ore carrying as follows:

| | |
|---|---|
| Lime | 3.4 % |
| Manganese | 12.15% |
| Zinc | 3.43% |
| Lead | 2.90% |
| Iron | 34.55% |
| Silica | 12.75% |
| Silver | 2.15 ozs. per ton |
| Gold | .02 ozs. per ton |

Various ores are treated with $SO_2$ gas and moisture as above, useless acidity can be eliminated by air and any necessary oxidization be induced at the same time, useless acidity can also be taken up by fresh ore and the solution separated from the insoluble residue, is treated with the oxid, hydrate, the carbonate also can be used, of such metals as sodium, potassium, magnesium, calcium and others that will precipitate the corresponding salt, from which the oxid of zinc can be readily obtained by calcination and other ways.

The matter of separation of various metals for reasons above given becomes obvious: Hence, lead and iron are separated, recovered and eliminated as described, lime likewise and this is a matter of importance for the purpose of regulating the amount of lime in the subsequent products such as zinc oxid, which for certain use cannot be used where it contains more than ¼ per cent. In oxidizing the solution the bulk of the lime is converted to the sulfate and can be rejected or separated and recovered at any convenient stage. The manganese and zinc can be precipitated and recovered together in the form and by means of such precipitants as described under the recovery of zinc and manganese respectively, without the use of a halogen element or compounds thereof. In the presence of a sufficiency of a halogen element, as above described, the manganese is precipitated as peroxid, however in using a combination of the precipitants mentioned manganese can be separated from zinc, its oxid also the carbonate in the presence of a sufficiency of a halogen element as mentioned will precipitate manganese as peroxid practically pure. This can be separated and the balance of the manganese eliminated from the solution as described. Should this recovered portion be found to be not entirely free from zinc it can be used for its zinc contents in precipitating more manganese as described until the remaining undissolved peroxid of manganese is free from zinc. It is well understood that the requisite quantities of the precipitant will be used in accordance with the product desired. The solution being freed from the aforementioned metals and manganese as well, the zinc is precipitated and recovered as above described. Volatilization can also be used to separate the combined manganese and zinc product, the solvents used being mineral acids such as sulfurous and others.

Having thus described my process, what I claim is:

1. A process for recovering zinc from mineral matter and the like consisting in treating the ore with a mineral acid such as $SO_2$ gas in the presence of moisture, eliminating excess acidity of solution, oxidizing the solution with a suitable oxidizing agent separating same from any insoluble matter, treating the solution with the hydrate of a metal which has a soluble sulfate that can precipitate a corresponding salt of zinc, sufficiently calcining the zinc so precipitated thereby recovering the zinc as an oxid.

2. A process for recovering zinc and other metals from mineral matter and the like containing various metals consisting in treating the mineral matter with fumes containing sulfur dioxid in the presence of sufficient moisture, eliminating unnecessary acidity of solution, precipitating manganese by means of the hydrate of a metal and in the presence of a halogen element that can precipitate the manganese, meanwhile maintaining the solution slightly acid eliminating the precipitated manganese and recovering the zinc.

3. A process for recovering zinc and other metals from mineral matter and the like containing various metals consisting in treating the mineral matter with fumes containing sulfur dioxid in the presence of sufficient moisture, eliminating unnecessary acidity of solution, precipitating the manganese by means of zinc oxid and in the presence of chlorin the quantity of each precipitant and the acidity of the solution being such that the manganese alone is precipitated, eliminating the precipitated manganese and recovering the zinc.

4. A process for recovering zinc and other metals from mineral matter and the like containing various metals consisting in treating the mineral matter with fumes containing sulfur dioxid in the presence of sufficient moisture, eliminating unnecessary acidity of solution, precipitating manganese by means of zinc oxid in the presence of chlorin the quantity of each reagent and the acidity of the solution being such that manganese is precipitated as peroxid free from precipitant zinc, eliminating and recovering the precipitated manganese.

5. A process for recovering zinc and other metals from metalliferous matter and the like containing various metals consisting in treating the mineral matter with fumes containing sulfur dioxid in the presence of sufficient moisture, eliminating unnecessary acidity of solution and oxidizing the solution whereby lead and iron are eliminated and recovering the zinc.

6. A process for recovering zinc and other metals from metalliferous matter and the like containing various metals consisting in treating the mineral matter with fumes containing sulfur dioxid in the presence of sufficient moisture, eliminating unnecessary acidity of solution, and oxidizing the solution whereby lead and iron are eliminated and recovering the zinc.

7. A process for recovering zinc and other metals from metalliferous matter and the like containing various metals consisting in treating the mineral matter with fumes containing sulfur dioxid in the presence of sufficient moisture, eliminating unnecessary acidity of solution by means of mineral matter containing an oxygen compound of manganese that can reduce the acidity of the solution as well as oxidizing the same whereby lead and iron are eliminated and recovering the zinc.

8. A process for recovering zinc and other metals from metalliferous matter and the like containing various metals consisting in treating the mineral matter with fumes containing sulfur dioxid in the presence of sufficient moisture, eliminating unnecessary acidity of solution by means of mineral matter containing an oxygen compound of manganese that can reduce the acidity of the solution as well as oxidizing the same whereby lead and iron are eliminated, precipitating the manganese and recovering same.

9. A process for recovering zinc and other metals from metalliferous matter and the like containing various metals consisting in treating the mineral matter with fumes containing sulfur dioxid in the presence of sufficient moisture, eliminating unnecessary acidity of solution by means of mineral matter containing an oxygen compound of manganese that can reduce the acidity of the solution as well as oxidizing the same whereby lead and iron are eliminated, precipitating manganese by means of zinc oxid in the presence of chlorin the quantity of each reagent and the acidity of the solution being such that manganese is precipitated as peroxid, eliminating and recovering the precipitated manganese.

10. A process for recovering zinc and other metals from metalliferous matter and the like containing various metals consisting in treating the mineral matter with fumes containing sulfur dioxid in the presence of sufficient moisture, eliminating unnecessary acidity of solution by means of mineral matter containing an oxygen compound of manganese that can reduce the acidity of the solution as well as oxidizing the same whereby lead and iron are eliminated, precipitating manganese by means of oxid of zinc in the presence of chlorin the quantity of each reagent and the acidity of the solution being such that manganese is precipitated as peroxid $MnO_2$, eliminating the oxid and recovering the zinc.

In witness whereof, I have hereunto set my hand in the presence of two subscribing witnesses.

CHARLES S. VADNER.

Witnesses:
  DONNA MARGETTS,
  VIOLIA BAKER.